Patented July 28, 1942

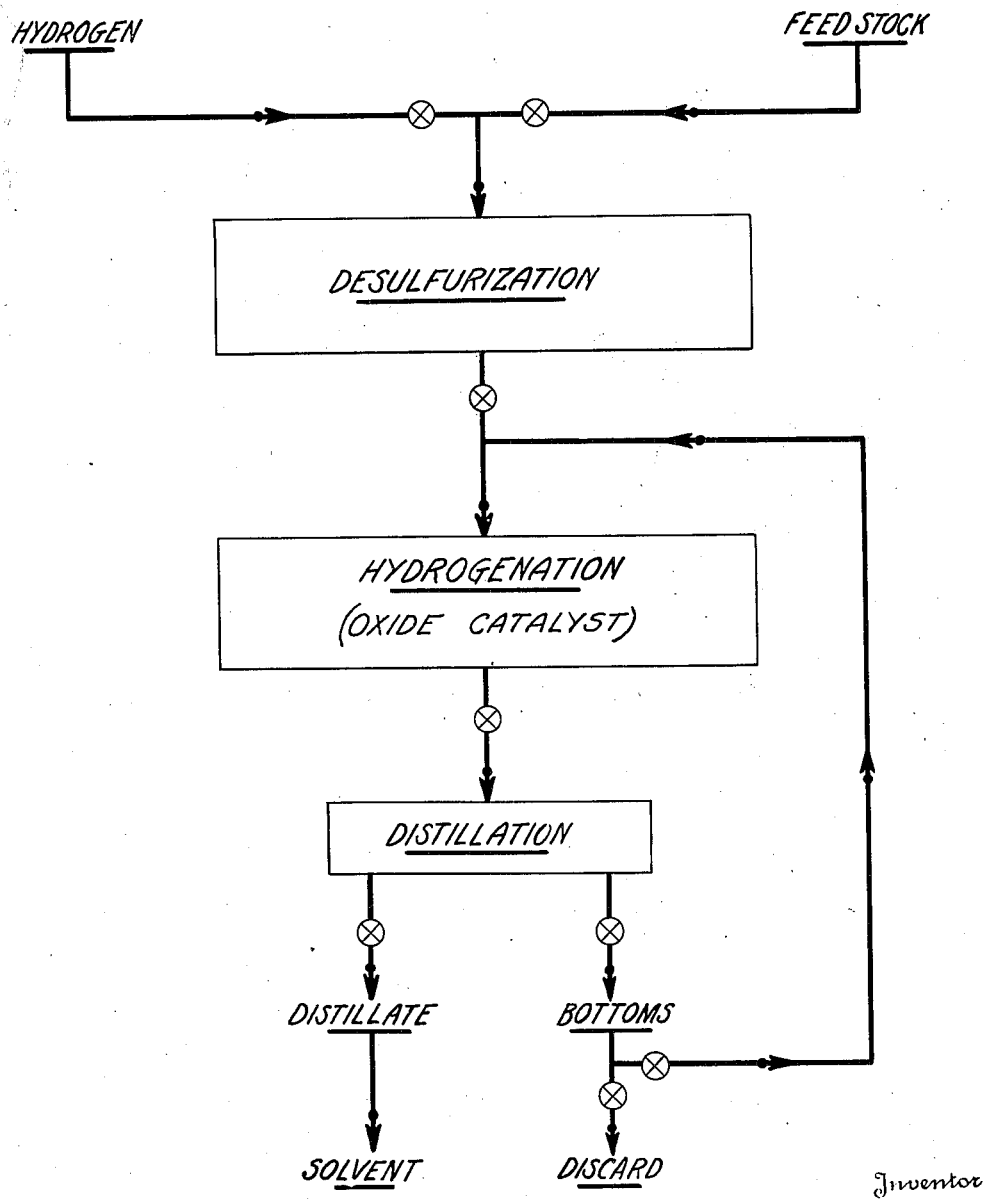

2,291,312

UNITED STATES PATENT OFFICE 2,291,312

PRODUCTION OF REFINED SOLVENTS

Jacquelin E. Harvey, Jr., Atlanta, Ga., assignor of one-half to Southern Wood Preserving Company, East Point, Ga., a corporation of Georgia Application March 14, 1941, Serial No. 383,462

10 Claims. (Cl. 196—53)

The present invention relates to a process for the recovery of valuable liquids from hydrocarbons.

This application is a continuation in part of my application Ser. No. 352,667, filed August 14, 1940, for Production of refined solvents, copending herewith, as to all matter common to the two applications.

An object of the invention is the production of refined solvents of lowered corrosivity from hydrocarbons of sulfur content and of higher boiling range.

Another object of the present invention is the production of refined solvents from liquid and solid hydrocarbons of sulfur content.

A more specific object of the present invention is the conversion of tars and fractions thereof characterized by sulfur content, in entirety if desired of the starting material remaining liquid, into refined solvents of superior solvency.

Other objects of the present invention will become apparent from the following disclosures.

The tars forming suitable starting materials for the present process are tars and their fractional parts derived from coal and petroleum, including gases and are characterized by content of aromatics and sulfur.

Starting materials previously subjected to the action of hydrogen are suitable starting materials.

Starting materials of the present process also include tars of aromatic content from which low boiling fractions have been removed, as for instance tars from which solvent oils have been removed. Viewed broadly, the starting materials of the present process are tars of aromatic content, fractions of said tar more viscous than the starting material due to removal of low boiling fractions from the starting material, high boiling fractions and pitches.

Coal tar and fractions thereof will be shown as a starting material of the following description, but it will be immediately apparent that other tars or fractions thereof of sulfur content serve as suitable starting materials.

Coal tar is a destructive distillate of coal, generally having a preponderance of fractions boiling above 190° C. and a typical specific gravity of 1.120, and in its higher boiling range represents molecular complexes that may be viewed as a multiplicity of ring structures.

To the end that coal tar in substantial entirety remaining liquid under the present process be converted if desired into solvents of the present process, said molecular complexes must be progressively or step-wise reduced in size, and, among other things, the present invention is predicated on such teaching.

As far as applicant understands the theory of the present invention, the same is predicated on the following:

First: by depolymerizing the molecular complexes in step-wise fashion they are finally brought down to the refined solvents of the present invention.

Second: that by impressing reaction conditions on said molecular complexes they are converted into solvents whose solvency is directly measurable and usable as opposed to the absence of such characteristics in the molecular complexes contained in the starting material, and, Third: said molecular complexes must be, to conform to the present invention depolymerized under conditions that induce no substantial quantity of normally liquid product that are other than aromatic. By the term substantial aromaticity as used herein and in the appended claims is meant that the refined solvents of the present invention have at least substantially 50% aromatic content.

Viewed broadly, the present invention provides a process wherein among other things, coal tar or the like, or fractions thereof, characterized by sulfur content, is subjected to the action of hydrogen to lower corrosivity, afterwards to the action of hydrogen under controlled conditions whereby the high molecular complexes of said starting material are reduced in step-wise manner to produce refined solvents of lowered corrosivity and are characterized by lowered and controlled boiling range and directly measurable and usable solvency as opposed to the absence of similar characteristics in said molecular complexes.

The invention will be understood from the following description of illustrative steps comprising various methods of securing the objects of the invention, when read in connection with the accompanying drawing wherein the figure is a diagrammatic sketch of an apparatus for carrying out a form of the process of the invention and wherein the nature of the step carried out in each chamber and the contents thereof are indicated by legend.

The following examples will serve to illustrate general principles upon which practice of the present invention is based, as well as the process of the present invention.

*Example 1.*—Coal tar, specific gravity 1.120 and 3% distilling at 210° C. and characterized by sulfur content is treated with hydrogen at 350° C. and 200 atmospheres pressure to lower sulfur content thereby lowering corrosivity, or providing for such in final product; the coal tar of reduced sulfur content is passed through a high pressure reaction vessel at a temperature of 405° C. and a pressure of 300 atmospheres. Flow of hydrogen is 15,000 cubic feet per barrel tar. The time of contact is one hour and the catalyst molybdenum oxide. The beneficiated coal tar flowing from the reactor is distilled to an upper limit of 210° C. to recover the refined solvent of lowered corrosivity as a distillate. The residue resulting from said solvent recovery is of a more liquid nature than a comparable cut on the starting material, indicating that the high boiling ends formerly described as including multiplicity of rings had been either saturated or partially saturated, thus providing the initial step in the step-wise conversion of substantially the entirety of the tar remaining liquid under process conditions into the refined solvent of lowered corrosivity of the present invention.

The residue resulting from refined solvent recovery may be recycled for further conversion to the refined solvent of the present invention.

Thus, under the action of hydrogen while contacting an oxide catalyst, the starting tar under temperature and pressure conditions chosen from in excess of 250° C. and atmospheric, respectively, is converted to refined solvents of lowered corrosivity boiling, as an example, below 210° C., said refined solvents being characterized by at least substantially 50% aromatic content, and being further characterized by being products produced while step-wise reduction of a multiplicity of rings is being effected; said solvents may be further characterized as being those products flowing from ring reduction, including in size, wherein said reduction is accomplished under coordinated time, temperature and pressure conditions that preclude carbonaceous deposition, as for instance 25%; carbonaceous deposition referring to any time or period of the process wherein controls are impressed for multiplicity of ring reduction for final formation if desired of the refined solvent of the present invention.

After formation of the refined solvent of lowered corrosivity of the present invention and removal thereof from the parent and beneficiated material, said refined solvent may be fractionally cut as desired, or the cut or cuts may be effected at the time of recovery from the parent material.

Viewed broadly, the present invention provides a process for subjecting tars or fractions thereof boiling substantially or completely above 190° C., characterized by sulfur content and derived from coal, petroleum or gas to the action of hydrogen, as heretofore stated, one or more times, as to induce solvency of usable and measurable quality as opposed to the absence of such characteristic in the ring multiples contained in the starting material.

The present invention may be practiced in a discontinuous manner, or in a continuous manner in a high pressure reaction chamber, a series of reaction chambers, a parallelism of reaction chambers including a multiplicity thereof.

By the term beneficiated as herein and in the appended claims is meant the starting material at least once subjected to the action of hydrogen for depolymerization of ring multiples.

By the term depolymerization is also meant the action of hydrogen on hydrocarbons containing a plurality of rings whereby to effect reduction, including in size, thus providing if desired constituency for the refined solvents of the present invention.

Solvents of the present invention are not circumscribed by any definite boiling range, but are rather characterized by substantial aromaticity as heretofore described, and the solvent so produced may serve as substitutes for the boiling range or ranges of benzene, toluene, xylene and the various naphthas and plasticizers. Heavy naphthas proposed as solvents are currently available having an end point in the order of 360° C.; the present invention provides for cutting the solvent at any desired point with subsequent fractionation into desired cuts as may be dictated by commercial necessity; residue may be recycled as aforetaught.

The phase condition of the present process is liquid phase and is not that phase that gasifies all starting materials. The term liquid phase as used herein may not be technically correct, but is meant to differentiate from processes that gasify all material processed.

The starting materials of the present process are not circumscribed by limitations in carbon content, being merely limited by the nature of tars or fractions thereof available. Tars of more than usual carbon content may be depolymerized under less severe conditions at first, with severe conditions progressively applied until maximum reaction conditions are attained.

Many modes of practicing the present invention are possible as will be apparent to those skilled in the art. For instance, tar may be stripped of any percentage of low boiling ends and the residual mass then treated in accordance with the present process to provide the products—refined solvents of lowered corrosivity—of the present invention.

Thus, pitches hard or soft are among the starting materials of the process; also included in the starting materials of the present process are those residual portions of tar, more viscous than the parent material, resulting from removal of low boiling ends therefrom. Viewed broadly, the starting materials of the present process are tars and fractions thereof characterized by sulfur content, and may have been at least once refined as by hydrogen.

High boiling aromatic tars of sulfur content produced by the petroleum industry are usable starting materials.

Those skilled in the art know that hydrogenations proceed at lowered pressures, however, commercial recoveries of the refined solvents of the present process are best effected at elevated pressures, thus the present invention includes use of pressures as high as practicable. The time element of treatment may be as short as one hour, or less; however, tars of appreciable carbon content may require longer periods.

The solvents of the present invention are varied in boiling range and include the ranges of any or all of the following:

| Product | Boiling range °C |
|---|---|
| Benzol | 78–120 |
| Toluol | 100–150 |
| Hi-flash naphtha | 150–200 |
| High boiling crudes | 175–360 |
| Heavy naphtha | 150–290 |
| Plasticizers | 160–360 |

Instead of controlling the process to provide a low boiling point of 78° C., as for instance in the benzol shown, processing may be controlled to produce lower boiling products. Controls of lesser intensity produce solvents of higher initial point, while controls of greater intensity produce solvents of lower boiling points.

The solvent of the present process may be characterized by containing fractions boiling at least 150° C. to 200° C.

*Example 2.*—It has been discovered that when subjecting certain mixtures of refined coal tar fractions to the action of hydrogen in accordance with the present process for the production of solvents and/or plasticizers that the formerly accepted teaching that product increment, depolymerization and/or hydrogen absorption are linear functions of the time, is not followed.

When subjecting a mixture of crude coal tar fractions boiling predominantly above 250° C or 275° C. to the action of hydrogen, research has disclosed that the newly induced product, depolymerization and/or hydrogen absorption are linear functions of the time. As an example, when the above mixture of crude coal tar fractions is subjected to the action of hydrogen for 2-, 5-, and 8-hour periods, the newly induced products, depolymerization and/or hydrogen absorption were linear functions of the time element.

One of the preferred starting materials of the present process is a mixture of refined coal tar fractions boiling predominantly above 355 or 380° C. Such a starting material is conveniently the final residue resulting from evaporating coal tar to dryness or substantial dryness and then stripping wood preservative from the distillate. This final residue mass of refined tar fractions is an especially suitable refined pitch to be used as starting material of the present process. However, in contradistinction to the mixture of crude coal tar fractions boiling predominantly above 250 or 300° C., when the aforenamed preferred starting material is subjected to the action of hydrogen for production of solvents, and/or plasticizers, the newly induced fractions, depolymerization and/or hydrogen absorption are not, as described for the other crude mixture of tar fractions, linear functions of the time. A critical period of treatment by or with hydrogen exists, and which if exceeded causes loss of newly induced fractions, polymerization and/or lessened hydrogen absorption on certain fractions of the preferred starting material under treatment.

The critical time element because of the obvious possible variations in the characteristics of the aforenamed refined coal tar pitch cannot be spoken of as an arbitrary figure. It can be stated, however, that if the refined pitch were to be subjected to the action of hydrogen for such a length of time, which for the other crude tar fractions would illustrate that the newly induced fraction, depolymerization and/or hydrogen absorption were linear functions of the time element, loss of induced products, polymerization and/or lessening of hydrogen absorption would occur. When treating the refined coal tar pitch by or with hydrogen, the critical time element is in the order of about three hours.

In the disclosures made herein and in the appended claims distillate removal of low boiling portions from the beneficiated material is considered the equivalent of fractional removal by gas movement, solvent action or the like. The converse also obtains.

A refined coal tar pitch chosen from the group boiling predominantly above, and above, 355° C. and characterized by sulfur content is treated with hydrogen at 375° C. and 200 atmosphere pressure to lower sulfur content thereby lowering corrosivity, or at least providing for such in a final product. The hydrogen action named is for the specific purpose of, among other things, lowering sulfur content, and not the production of the solvent and/or solvents of the present process. The refined coal tar pitch of reduced sulfur content is then passed through a high pressure reaction vessel at a temperature of 430° C. and a pressure of 325 atmospheres. Flow of hydrogen is 16,000 cubic feet per barrel material treated. The time of contact is two hours and the catalyst selected from the group consisting of oxides of the sixth and eighth periodic groups. If desired, however, the reaction may be carried forward in the absence of a catalyst, assuming the walls of the reaction chamber to have no catalytic effect. The beneficiated refined coal tar pitch of lowered sulfur content flowing from the reactor is distilled to an upper limit of 300° C. to recover the refined solvent of lowered corrosivity as a distillate. The residue resulting from said solvent recovery is of a more liquid nature than a comparable cut on the starting material, indicating that the high boiling end formerly described as including multiplicity of ring structures had been, at least, either saturated or partially saturated, thus providing a step in the step-wise conversion of substantially the entirety of the refined pitch remaining liquid under process conditions into the refined solvent of lowered corrosivity of the present process.

The residue resulting from the recovery of the refined solvent from the beneficiated refined pitch may be recycled for conversion to additional refined solvents.

In the instance of the solvent recovered to an upper limit of 300° C. as above described, the solvent cut may be divided to provide solvents of various boiling ranges as may be dictated by necessity. In the event a deep cut is taken on the beneficiated refined pitch to provide the solvent and/or solvents of the present process the upper boiling portion of the deep cut may provide a product having induced plasticizing properties.

When subjecting a refined pitch to the action of hydrogen for the production of solvents in accordance with the present process, the hydrogen action characterized by solvent increment is controllably held at or below the critical time period, and if such is exceeded adverse reaction will occur. As an example, if the critical time period is exceeded, instead of fractional increment, depolymerization and/or hydrogen absorption being linear functions of the time element, the reverse will obtain. In other words, if the critical time period is exceeded, fractional increment, depolymerization and/or hydrogen absorption will not be linear functions of the time element, it having been found, among other things, that a period in excess of that which is critical will provide for loss of fractional increment and/or polymerization.

The critical time element in the instance of treating the refined coal tar pitch with hydrogen is in the order of about three hours, and the present process is predicated on the employment of the critical, or less than the critical, time element.

The refined solvents of lowered corrosivity as flowing from the conversion product of the refined coal tar pitch are of superior quality and are characterized by a preponderance of ring structures.

Broadly considered, the present process provides a method for converting tars of aromatic content and fractions thereof including creosote, topped tars, stripped tars and various pitches characterized by sulfur content, to refined solvents of lowered corrosivity by the controlled action of hydrogen under conditions that induce no substantial percentage of liquid chain structures or substantial carbon deposits, as above explained.

The catalysts of the present invention are oxides; oxides of metals of the 6th and 8th periodic groups are usable, however, all oxides catalyst may be used. Difficultly reducible oxides are preferred.

In the first cycle of hydrogen action that reduces sulfur content, said reduction of sulfur may be accomplished in the presence of a catalyst. Catalysts effective in the presence of hydrogen are usable, as for instance the oxides and/or sulfides of molybdenum, vanadium, uranium, cobalt, tin, manganese, tungsten or the like.

In the disclosures herein made the removing of low boiling fractions by gas movement or pressure release is considered the equivalent of distillation.

An especially attractive use of the refined pitch in accordance with the present process is to first depolymerize said pitch by use of a solvent; as an example, but not as a limitation, a refractory solvent. The solvent may be employed in quantities of up to volume for volume, or more. After the refined pitch has been depolymerized, or partially depolymerized with a solvent, the solvent and solute are then subjected to the action of hydrogen in accordance with the present process.

When reference is made to high molecular complexes contained in the starting material, and when the starting material contains low boiling fractions that are not considered high molecular complexes, it is of course obvious that the high molecular complexes contained in the starting material are to a certain extent depolymerized by the solvent present.

Temperatures for employment in the second hydrogen cycle may be selected between the limits of 200–600° C., as for instance 405° C. or 430° C., as noted in Examples 1 and 2, respectively.

It will be seen that by reduction of sulfur content of the material under treatment during any stage of hydrogen action, the oxide catalyst used during subsequent stages is at least partially protected from the effect of the sulfur.

The evaluation of solvent power is conveniently accomplished by finding the well-known aniline point of Kauributanol number. The evaluation of plasticizing properties is conveniently accomplished by recourse to methods suggested in Chapter VI, "The Technology of Solvents" by Dr. Otto Jordon, Mannheim, Germany, translated by Alen D. Whitehead, Chemical Publishing Company of New York, Incorporated, New York, New York.

Minor changes may be made in the foregoing without departing from the spirit of the invention.

I claim:

1. The process of producing a solvent from the refined pitch produced by stripping high temperature coal tar to at least about substantial dryness, and fractionating the overhead material to recover a liquid useful as a wood preservative, and a higher boiling fraction boiling predominantly above 355° C., which process comprises: subjecting said higher boiling fraction to the action of hydrogen whereby to lower sulfur content whilst precluding substantial solvent increment; subjecting the material of lowered sulfur content to the action of hydrogen for a period not in excess of about three hours, whereby to avoid loss of newly induced fractions, to provide a solvent.

2. The process of producing a solvent from the refined pitch produced by stripping high temperature coal tar to at least about substantial dryness, fractionating the overhead material to recover a liquid useful as a wood preservative, and a higher boiling fraction boiling predominantly above 355° C., which process comprises: subjecting said higher boiling fraction to the action of hydrogen whereby to lower sulfur content whilst precluding substantial solvent increment; subjecting the material of lowered sulfur content to the action of hydrogen for a period not in excess of about three hours, whereby to avoid loss of newly induced fractions; and fractionating the beneficiated material to provide low boiling fractions as a solvent.

3. The process of claim 2 with the inclusion of recycling the residue.

4. In the production of a solvent from the refined pitch produced by stripping high temperature coal tar to at least about substantial dryness, fractionating the overhead material to recover a liquid useful as a wood preservative, and a higher boiling fraction boiling predominantly above 355° C., the process which comprises: subjecting said higher boiling fraction to the action of hydrogen whereby to lower sulfur content whilst precluding substantial solvent increment; subjecting the material of lowered sulfur content to the action of hydrogen at a pressure in excess of atmospheric for a period not in excess of about three hours, whereby to avoid polymerization, to provide a solvent.

5. In the production of a solvent from the refined pitch produced by stripping high temperature coal tar to at least about substantial dryness, fractionating the overhead material to recover a liquid useful as a wood preservative, and a higher boiling fraction boiling predominantly above 355° C., the process which comprises: subjecting said higher boiling fraction to the action of hydrogen whereby to lower sulfur content whilst precluding substantial solvent increment; subjecting the material of lowered sulfur content to the action of hydrogen at a pressure in excess of atmospheric and a temperature selected between 200° C. and 600° C. for a period not in excess of about three hours, whereby to avoid lowered hydrogen absorption, to provide a solvent.

6. The process of producing a solvent which comprises: evaporating high temperature coal tar to at least about substantial dryness; fractionating the overhead material to recover a liquid useful as a wood preservative, and a higher boiling fraction boiling predominantly above 355° C.; subjecting said higher boiling fraction to the action of hydrogen at superatmospheric pressure and temperature of at least about 350° C. whereby to lower sulfur content whilst precluding substantial solvent increment; and subjecting the material of lowered sulfur content to the action of hydrogen at a pressure in excess of 50 atmospheres and a temperature selected between 200–600° C. for a period not in excess of about three hours, whereby to avoid loss of newly induced fractions, to provide a solvent.

7. The process of producing a solvent which comprises: evaporating high temperature coal tar to at least about substantial dryness; fractionating the overhead material to recover a liquid useful as a wood preservative, and a higher boiling fraction boiling predominantly above 355° C.; subjecting the higher boiling fraction to the action of hydrogen whereby to lower sulfur content whilst precluding substantial solvent increment; subjecting the material of lowered sulfur content to the action of hydrogen for a period not in excess of about three hours, whereby to avoid loss of newly induced fractions; and fractionating the beneficiated material to provide low boiling fractions as a solvent.

8. The process of claim 7 with the inclusion of recycling the residue.

9. The process of producing a solvent which comprises: evaporating high temperature coal tar to at least about substantial dryness; fractionating the overhead material to recover a liquid useful as a wood preservative, and a higher boiling fraction boiling predominantly above 355° C.; subjecting said higher boiling fraction to the action of hydrogen at superatmospheric pressure and a temperature of at least 350° C. whereby to lower sulfur content whilst precluding substantial solvent increment; and subjecting the material of lowered sulfur content to the action of hydrogen at a pressure in excess of atmospheric and a temperature selected between the limits of 200-600° C. for a period not in excess of about three hours, whereby to avoid polymerization, to produce a solvent.

10. The process of producing a solvent which comprises: evaporating high temperature coal tar to at least about substantial dryness; fractionating the overhead material to recover a liquid useful as a wood preservative, and a higher boiling fraction boiling predominantly above 355° C.; subjecting said higher boiling fraction to the action of hydrogen whereby to lower sulfur content whilst precluding substantial solvent increment; and subjecting the material of lowered sulfur content to the action of hydrogen at a pressure in excess of atmospheric and a temperature between 200° C. and 600° C. for a period not in excess of about three hours, whereby to avoid lowered hydrogen absorption, to provide a solvent.

JACQUELIN E. HARVEY, JR.